(12) United States Patent
Corrado et al.

(10) Patent No.: US 11,068,279 B2
(45) Date of Patent: Jul. 20, 2021

(54) CONCURRENT REPLACEMENT OF DISTRIBUTED CONVERSION AND CONTROL ASSEMBLY

(71) Applicant: INTERNATIONAL BUSINESS MACHINES CORPORATION, Armonk, NY (US)

(72) Inventors: Ronald P Corrado, Wappingers Falls, NY (US); Anthony Joseph Cozzolino, New Paltz, NY (US); Gerald Fahr, Wappingers Falls, NY (US); Bret G Bidwell, Hopewell Junction, NY (US); Ellick Chi-lick Law, Woodstock, NY (US); Patrick Caffrey, Saugerties, NY (US); William Wajda, Staatsburg, NY (US)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 0 days.

(21) Appl. No.: 16/804,147

(22) Filed: Feb. 28, 2020

(65) Prior Publication Data

US 2020/0285484 A1 Sep. 10, 2020

Related U.S. Application Data

(60) Provisional application No. 62/813,545, filed on Mar. 4, 2019.

(51) Int. Cl.
*G06F 9/4401* (2018.01)
*G06F 1/14* (2006.01)
*G06F 1/28* (2006.01)

(52) U.S. Cl.
CPC .............. *G06F 9/4413* (2013.01); *G06F 1/14* (2013.01); *G06F 1/28* (2013.01)

(58) Field of Classification Search
CPC ............. G06F 9/4413; G06F 1/14; G06F 1/28
USPC ......................................................... 713/100
See application file for complete search history.

(56) References Cited

U.S. PATENT DOCUMENTS

| | | | |
|---|---|---|---|
| 6,675,293 B1 \* | 1/2004 | Beebe ....................... | G06F 8/65 713/1 |
| 6,820,157 B1 | 11/2004 | Eide et al. | |
| 6,832,262 B2 \* | 12/2004 | Cromer ................... | H04L 29/12 709/203 |

(Continued)

*Primary Examiner* — Paul R. Myers
(74) *Attorney, Agent, or Firm* — William Hartwell; Andrew D. Wright; Roberts Calderon Safran & Cole, P.C.

(57) ABSTRACT

A method includes identifying a first distributed conversion and control assembly (DCCA) in a central electronics complex (CEC) of a computer system, the CEC containing the first DCCA and a second DCCA, each of the first DCCA and the second DCCA having a flexible service processor (FSP); determining that the computer system satisfies preconditions for concurrent replacement of the first DCCA; disabling control software for a thermal and power management device (TPMD) of the first DCCA; fencing off the first DCCA; depowering the first DCCA; receiving a new media access control (MAC) address of a replacement DCCA; reconfiguring an operating system of the CEC to recognize the new MAC address of the replacement DCCA; powering on the replacement DCCA; removing the fencing off of the first DCCA; and resetting an FSP of the replacement DCCA.

20 Claims, 5 Drawing Sheets

(56) References Cited

U.S. PATENT DOCUMENTS

| | | | |
|---|---|---|---|
| 6,928,491 B2* | 8/2005 | Heffernan | G06K 13/085 709/216 |
| 8,090,810 B1* | 1/2012 | Insley | G06F 11/3006 709/223 |
| 2003/0188222 A1* | 10/2003 | Abbondanzio | G06F 11/2028 714/12 |
| 2006/0036877 A1* | 2/2006 | Anderson | G06F 1/3209 713/300 |
| 2007/0022229 A1* | 1/2007 | Sasaki | G06F 13/4081 710/51 |
| 2008/0126854 A1* | 5/2008 | Anderson | G06F 11/2028 714/13 |
| 2011/0246828 A1* | 10/2011 | Monchiero | G06F 11/1438 714/31 |
| 2012/0137165 A1 | 5/2012 | Wu et al. | |
| 2013/0346790 A1 | 12/2013 | Elpula et al. | |
| 2014/0075567 A1* | 3/2014 | Raleigh | G06Q 30/0601 726/26 |
| 2015/0006951 A1 | 1/2015 | Gurram et al. | |
| 2017/0257275 A1* | 9/2017 | Atyam | H04L 41/0663 |
| 2018/0034704 A1* | 2/2018 | Kakkar | H04L 41/0816 |
| 2018/0074909 A1* | 3/2018 | Bishop | G06F 11/1466 |

* cited by examiner

FIG. 5

CONCURRENT REPLACEMENT OF DISTRIBUTED CONVERSION AND CONTROL ASSEMBLY

BACKGROUND

Aspects of the present invention relate generally to the replacement of computer server rack components and, more particularly, to the concurrent replacement of a distributed conversion and control assembly in a computer.

Some supercomputers provide redundant hardware components designed to offer high performance, availability, and resilience. One of these components is the distributed conversion and control assembly (DCCA). In some supercomputers there are two DCCAs per central electronics complex (CEC) drawer in a server rack. The DCCA includes both a power supply and an active management processor called the flexible service processor (FSP).

SUMMARY

In a first aspect of the invention, there is a computer-implemented method including: identifying, by a computing device, a first distributed conversion and control assembly (DCCA) in a central electronics complex (CEC) of a computer system, the CEC containing the first DCCA and a second DCCA, each of the first DCCA and the second DCCA having a flexible service processor (FSP); determining, by the computing device, that the computer system satisfies preconditions for concurrent replacement of the first DCCA; disabling, by the computing device, control software for a thermal and power management device (TPMD) of the first DCCA; fencing off, by the computing device, the first DCCA; depowering, by the computing device, the first DCCA; receiving, by the computing device, a new media access control (MAC) address of a replacement DCCA; reconfiguring, by the computing device, an operating system of the CEC to recognize the new MAC address of the replacement DCCA; powering on, by the computing device, the replacement DCCA; removing, by the computing device, the fencing off of the first DCCA; and resetting, by the computing device, an FSP of the replacement DCCA.

In another aspect of the invention, there is a computer program product including one or more computer readable storage media having program instructions collectively stored on the one or more computer readable storage media. The program instructions are executable to: identify a first distributed conversion and control assembly (DCCA) in a central electronics complex (CEC) of a computer system, the CEC containing the first DCCA and a second DCCA, each of the first DCCA and the second DCCA having a flexible service processor (FSP); determine that the computer system satisfies preconditions for concurrent replacement of the first DCCA; move an oscillator to the second DCCA as a result of the oscillator running on the FSP of the first DCCA; depower the first DCCA; receive a new media access control (MAC) address of a replacement DCCA; reconfigure an operating system of the CEC to recognize the new MAC address of the replacement DCCA; power on the replacement DCCA; and reset an FSP of the replacement DCCA.

In another aspect of the invention, there is system including a processor, a computer readable memory, one or more computer readable storage media, and program instructions collectively stored on the one or more computer readable storage media. The program instructions are executable to: identify a first distributed conversion and control assembly (DCCA) in a central electronics complex (CEC) of a computer system, the CEC containing the first DCCA and a second DCCA, each of the first DCCA and the second DCCA having a flexible service processor (FSP); determine that the CEC is operating; determine that the second DCCA is capable of providing sufficient power to power the CEC; determine that an oscillator and a time of day (TOD) clock are in a proper operating state and are capable of running on both the first DCCA and the second DCCA; determine that the computer system will not prevent the replacement of the first DCCA; disable control software for a thermal and power management device (TPMD) of the first DCCA; fence off the first DCCA; depower the first DCCA; receive a new media access control (MAC) address of a replacement DCCA; and reconfigure an operating system of the CEC to recognize the new MAC address of the replacement DCCA.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to the replacement of computer server rack components and, more particularly, to the concurrent replacement of a distributed conversion and control assembly in a computer. According to aspects of the invention, a computing device: identifies a defective distributed conversion and control assembly (DCCA) in a central electronics complex (CEC) of a computer system, the CEC containing the first DCCA and a second DCCA, each of the first DCCA and the second DCCA having a flexible service processor (FSP); determines that the computer system satisfies preconditions for concurrent replacement of the first DCCA; disables control software for a thermal and power management device (TPMD) of the first DCCA; fences off the first DCCA; depowers the first DCCA; receives a new media access control (MAC) address of a replacement DCCA; reconfigures an operating system of the CEC to recognize the new MAC address of the replacement DCCA; powers on the replacement DCCA; removes the fencing off of the first DCCA; and resets an FSP of the replacement DCCA. In embodiments, the second DCCA controls the CEC while the first DCCA is being replaced. In this manner, implementations of the invention facilitate the replacement of one of the DCCAs in a CEC without taking the CEC offline. This improves productivity of the computer system that includes the CEC.

Prior to embodiments of the invention, the service procedure of replacing a DCCA required a scheduled system outage in order to perform the hardware replacement. This results in hours of performance loss, as this CEC cannot be used until the process is complete.

Embodiments of the invention include a process to concurrently replace a DCCA. The term concurrent means that the process has no performance impacts and does not require system downtime. Embodiments are implemented via a software tool that abstracts the user from all but the physical removal and replacement of the DCCA hardware. Embodiments permit the replacement of one DCCA of a CEC (without taking the CEC offline) by using the other DCCA of the CEC during the replacement of the first DCCA.

Implementations of the invention are improvements to the functioning of a computer. For example, embodiments of the invention improve the productivity of a computer system by permitting the concurrent replacement of one DCCA in a CEC without having to take the CEC offline.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
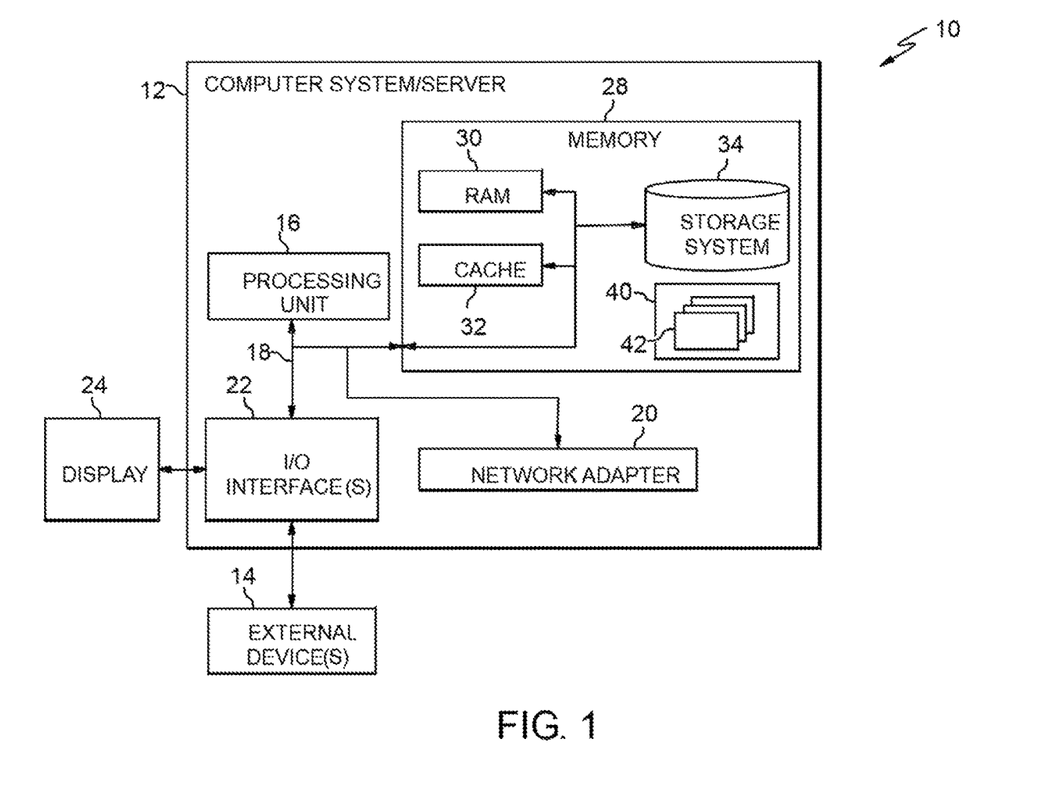
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
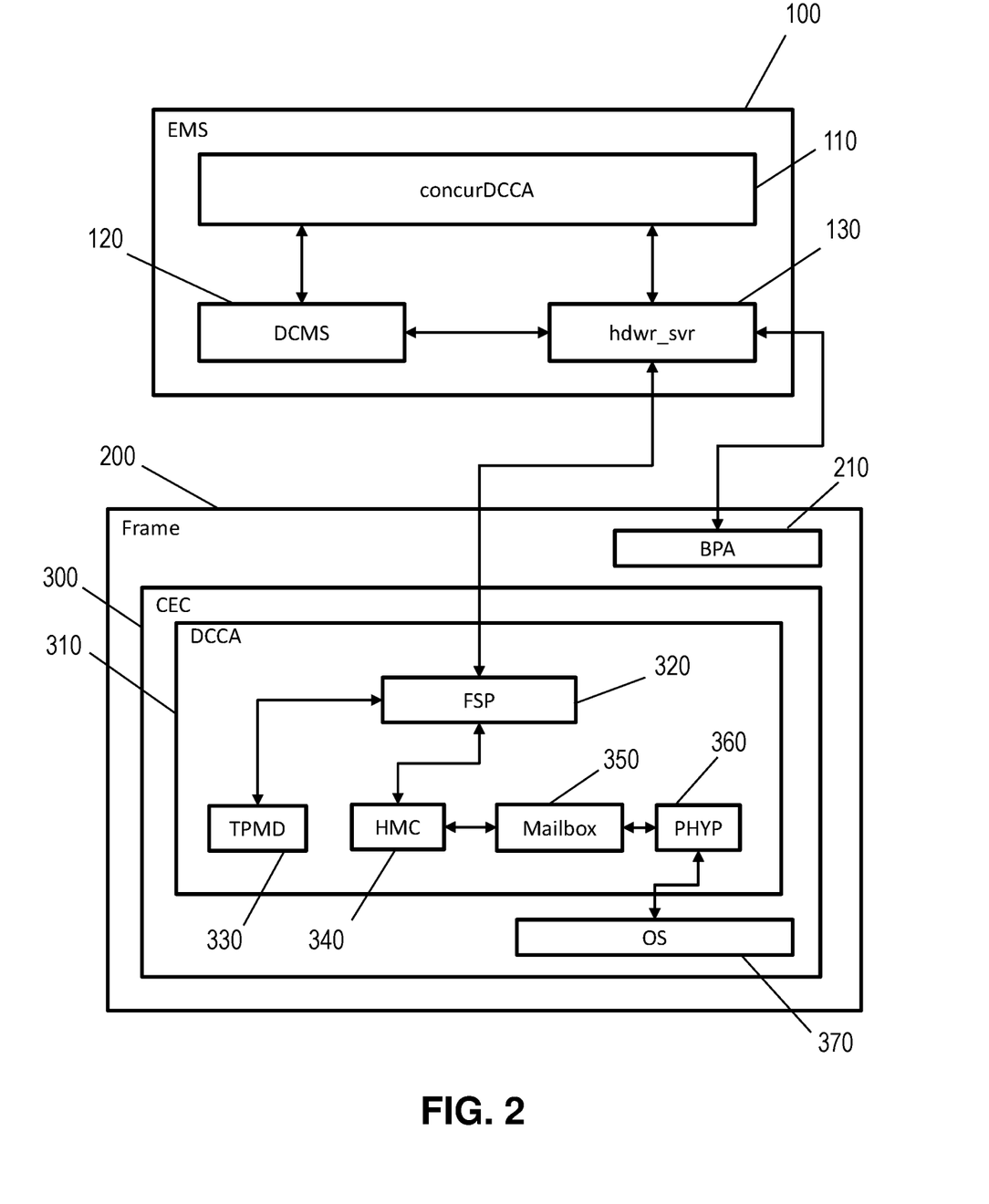
FIG. 2 shows a block diagram of an exemplary environment in accordance with aspects of the invention.

FIG. 2 shows a block diagram of an exemplary environment in accordance with aspects of the invention. In embodiments, the environment includes an executive management server (EMS) 100 and a server rack or frame 200.

In this example, executive management server (EMS) 100 comprises a concurrent DCCA replacement tool (concurDCCA) 110, distributed computing management software (DCMS) 120, and hdwr_svr 130. In embodiments, concurDCCA 110 is implemented as a client of hdwr_svr 130, which is a component of network management service software. In embodiments, hdwr_svr 130 runs as a daemon process on EMS 100. In embodiments, EMS 100 is a computer system such as, for example, computer system 12 of FIG. 1. In embodiments, one or more of concurDCCA 110, DCMS 120, and hdwr_svr 130 are program modules such as, for example, program modules 42 of FIG. 1.

Figure 3:
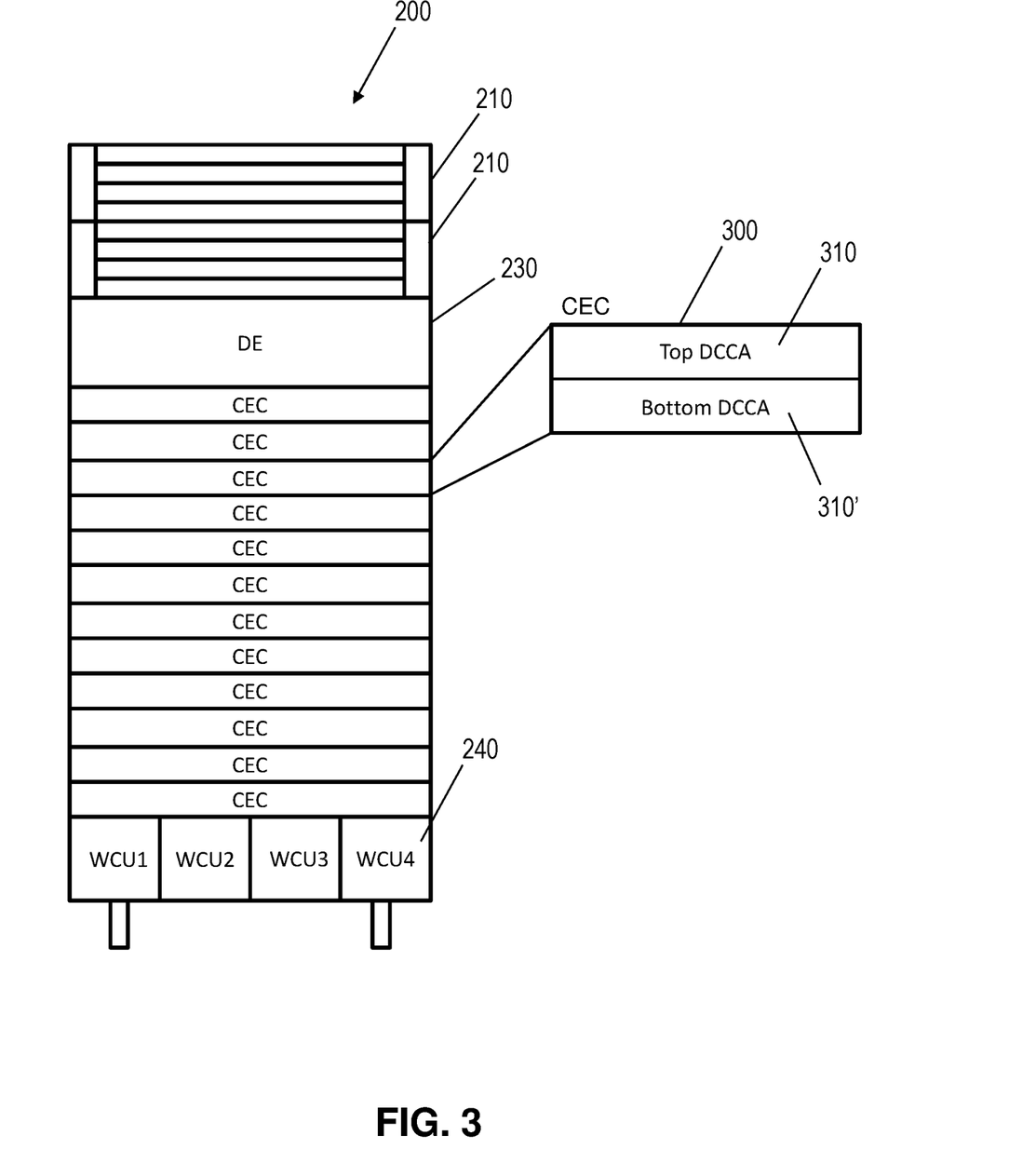
FIG. 3 shows a schematic partial drawing of an exemplary server rack in accordance with aspects of the invention.

FIG. 3 shows an example of frame 200 of FIG. 2. In this example, frame 200 is a rack that houses several components. In embodiments, frame 200 has one or more bulk power assembly (BPA) 210 that house various components such as, for example, bulk power regulators, bulk power control and communication hubs, and bulk power distribution cards. In embodiments, frame 200 has one or more disk enclosures (DE) 230, and one or more water conditioning units (WCUs) 240. In embodiments, frame 200 includes a plurality of CECs such as, for example, CEC 300. In embodiments, each CEC 300 includes two DCCAs, a first DCCA 310 and a second DCCA 310' that provide redundancy in CEC 300. While FIG. 3 shows first DCCA 310 in a top position and second DCCA 310' in a bottom position, and the disclosure refers to first DCCA 310 being the DCCA that is replaced, it is noted that embodiments include replacing any DCCA (such as, for example, the top DCCA or the bottom DCCA) in a CEC. Further, reasons for replacing a DCCA (such as first DCCA 310 or second DCCA 310') include failure, upgrading, regular maintenance, and other reasons.

FIG. 2 shows only first DCCA 310 of CEC 300, but it is noted that CEC 300 also includes second DCCA 310'. It is also noted that, in this example, second DCCA 310' includes the same components as first DCCA 310. In this example, first DCCA 310 includes an FSP 320 which is, in embodiments, a control card for first DCCA 310. In this example, first DCCA 310 includes a thermal power management device (TPMD) 330 that monitors various temperatures of CEC 300, including of central processing units in CEC 300. In embodiments, TPMD 330 throttles back, or shuts down, CEC 300 if temperatures reach an unacceptable level.

In this example, first DCCA 310 includes a hardware management console (HMC) 340 which is a component of the firmware of FSP 320, and processes commands passed to FSP 320 by hdwr_svr 130. In this example, first DCCA 310 includes a mailbox 350 that passes particular commands from HMC 340 to a partition hypervisor (PHYP) 360. In embodiments, PHYP 360 is a converged hypervisor/low-level firmware code that provides a base for the various operating systems. In embodiments, CEC 300 has an operating system (OS) 370. In embodiments, both first DCCA 310 and second DCCA 310' provide power to CEC 300 and, in normal operation, both first DCCA 310 and second DCCA 310' operate and share the power load of CEC 300.

When first DCCA 310 of the computer system needs to be replaced, a technician starts concurDCCA 110 running on EMS 100. The technician starts concurDCCA 110 by specifying the name of the CEC (in this case, CEC 300) whose DCCA (in this case, first DCCA 310) needs to be replaced. Then the technician answers a simple question to specify whether it is first DCCA 310 or second DCCA 310' that needs to be replaced (in this example, it is first DCCA 310). In embodiments, concurDCCA 110 then takes over control of the replacement process. After depowering the DCCA to be replaced (first DCCA 310), concurDCCA 110 prompts the technician for the MAC address of a replacement DCCA (the replacement DCCA will be installed in CEC 300 to replace first DCCA 310). In embodiments, concurDCCA 110 uses the MAC address of the replacement DCCA to reconfigure the dynamic host configuration protocol (DHCP) part of OS 370 so that the replacement DCCA will be recognized by OS 370 and other parts of the computer system. In embodiments, concurDCCA 110 then signals for the technician to proceed with the physical hardware replacement of the replacement DCCA for first DCCA 310. In embodiments, concurDCCA 110 then waits for the technician to signal that the replacement is complete before continuing to the end of the process.

In embodiments, if a problem is encountered during the DCCA replacement process, concurDCCA 110 will attempt to resolve the problem. In embodiments, for a problem that concurDCCA 110 cannot solve, concurDCCA 110 offers the technician a choice to checkpoint the program so that the problem can be resolved by the technician. At the end of the DCCA replacement operation, if there are no unsolved problems and CEC 300 has regained full power, FSP control, and clock redundancy, then concurDCCA 110 declares the DCCA replacement process a success.

In embodiments, concurDCCA 110 sends most of the concurrent DCCA replacement operation commands to the hdwr_svr 130 through an opened service socket. Each command is constructed as an appropriate function call. In embodiments, hdwr_svr 130 passes each command to FSP 320 where it is processed by HMC 340. Some of these commands are executed directly on FSP 320 itself. Other commands are either passed by HMC 340 to PHYP 360 and then onto OS 370, or passed onto DCMS 120 for retrieving or setting machine status.

In embodiments, concurDCCA 110 also sends power commands to BPA 210 through an open BPA socket. In embodiments, concurDCCA 110 also executes distributed computing management commands on EMS 100 by directly calling a distributed computing management utility or command.

In embodiments concurDCCA 110 may comprise one or more program modules such as program modules 42 described with respect to FIG. 1. EMS 100 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In order to improve ease-of-use and resiliency of the concurrent DCCA replacement process, embodiments of the invention are tools that automate many of the steps, while also abstracting them from the user. The following is a summary of features of embodiments of the invention. A more detailed explanation is presented later in this disclosure.

In embodiments, concurDCCA 110 runs the process and error proofs the process. In embodiments, concurDCCA 110 provides ease of use because a technician does not need to know the inner workings of the process to complete the concurrent replacement of first DCCA 310. In embodiments, concurDCCA 110 runs on EMS 100 of the computer system that includes first DCCA 310. In embodiments, concurDCCA 110 requires a technician to answer only a few simple questions to gather information needed for the DCCA replacement process. In embodiments, concurDCCA 110 issues commands, in turn, to various sub-systems, as required by the DCCA replacement process. In embodiments, concurDCCA 110 is error proof. In embodiments, concurDCCA 110 ensures that the correct command sequence is carried out by carefully analyzing the result of each command. In embodiments, concurDCCA 110 ensures that timing of the various commands is correct so that no command is issued before it is needed or before it can be successfully executed. In embodiments, concurDCCA 110 maintains system availability during the DCCA replacement process. In embodiments, concurDCCA 110 ensures that the remaining DCCA (second DCCA 310') in CEC 300 can provide sufficient power to keep CEC 300 functioning during the DCCA replacement process. In embodiments, concurDCCA 110 ensures that the FSP of second DCCA 310' will take over control of CEC 300 and that the system clock and the internal network continue to function properly so that all processors within CEC 300 continue to function and communicate. In embodiments, after first DCCA 310 is replaced, concurDCCA 110 restores power redundancy, FSP redundancy and clock redundancy so that a system outage is avoided.

Supercomputers are complex systems. Unforeseen hardware or technical problems can be encountered while replacing a defective, or other, DCCA. In embodiments, concurDCCA 110 includes intelligence, or machine learning, to resolve some problems by itself. In embodiments, concurDCCA 110 includes a 'checkpoint restart' capability. In embodiments, when concurDCCA 110 encounters a problem which it cannot resolve, it will offer an option to stop the DCCA replacement process so that the unexpected problem can be resolved outside of concurDCCA 110. In embodiments, after the unexpected problem has been solved by, for example, a technician, then concurDCCA 110 is restarted to continue with the DCCA replacement process from the point where it was previously stopped.

Embodiments of the invention comprise two phases. A deactivating phase is conducted first, and then after the physical replacement of the DCCA, a reactivating phase is conducted.

In embodiments, during the deactivating phase, concurDCCA 110 determines if the computer system satisfies the preconditions for the concurrent replacement process. In embodiments, the preconditions include: CEC 300 being powered on and running; second DCCA 310' being able to provide sufficient power by itself to keep CEC 300 running; there is FSP availability, meaning that the FSP in second DCCA 310' is in the proper operation state; there is clock redundancy, meaning that the oscillators (clocks) and time of day (TOD) clock system are in the proper operation state and can run on either the FSP in first DCCA 310 or the FSP in second DCCA 310'; and CEC 300 does not have defective hardware fenced off that would prevent performing the concurrent DCCA replacement procedure. In embodiments, the oscillator is the processor clock of a DCCA. In embodiments, the oscillator is used to generate a square wave for processor timing and it needs to be sync'd between both FSPs in the CEC.

In embodiments, during the deactivating phase, concurDCCA 110 determines if first DCCA 310 contains the primary FSP of CEC 300. In a CEC such as, for example, CEC 300, one of the FSPs is a primary FSP that controls the CEC. If FSP 320 in first DCCA 310 is the primary FSP of CEC 300, then concurDCCA 110 starts a 'failover' process to make the FSP in second DCCA 310' (the "backup FSP") assume control of CEC 300 and, thus, become the primary FSP.

In embodiments, during the deactivating phase, concurDCCA 110 determines if the oscillator is running on FSP 320 of first DCCA 310 and if it is, moves it to the FSP of second DCCA 310'. In embodiments, during the deactivating phase, concurDCCA 110 determines if the TOD clock is active on FSP 320 of first DCCA 310 and, if it is, moves it to the FSP of second DCCA 310'. In embodiments, during the deactivating phase, concurDCCA 110 disables the control software for TPMD 330.

In embodiments, during the deactivating phase, concurDCCA 110 fences off FSP 320 of first DCCA 310 so that the computer system will not expect its presence while it is inactive. In embodiments, during the deactivating phase, concurDCCA 110 depowers first DCCA 310. In embodiments, during the deactivating phase, concurDCCA 110 receives the MAC address of the new, replacement DCCA into DCMS 120 and reconfigures the DHCP. This step ensures that the replacement DCCA is able to communicate with other sub-systems immediately after being plugged in and powered on.

In embodiments, during the reactivating phase, concurDCCA 110 powers on the replacement DCCA, which also activates the FSP in the replacement DCCA. In embodiments, during the reactivating phase, concurDCCA 110 removes the fencing of FSP 320 that was previously placed by concurDCCA 110.

In embodiments, during the reactivating phase, concurDCCA 110 waits for the FSP in the replacement DCCA to boot to its 'Standby' state. In embodiments, during the reactivating phase, concurDCCA 110 clears any automatically generated clock guard records (which are expected to occur during the physical replacement of first DCCA 310). In embodiments, guard records are created for a failed component detected by an FSP. These guard records prevent the use of the failed component. For example, clock guard records are created by the process for the FSP (FSP 320) in a DCCA being removed (DCCA 310). This prevents the FSP in the remaining DCCA (DCCA 310') from continually checking for the existence of an FSP that is no longer present and flagging it as an error. When the replacement DCCA is installed and activated, this guard record is cleared.

In embodiments, during the reactivating phase, concurDCCA 110 resets the FSP of the replacement DCCA and waits for it to reach 'Hypervisor Runtime' state. This step connects the FSP of the replacement DCCA to PHYP 360 so that the replacement DCCA can communicate with the CEC operating system.

In embodiments, during the reactivating phase, concurDCCA 110 restarts the oscillator and, after the oscillator is restarted, checks its redundancy status. If the oscillator has full redundancy, then the replacement process continues. Otherwise, concurDCCA 110 initiates a failover process to make the FSP of the replacement DCCA the primary FSP and then attempts to restart the oscillator again. If the oscillator has redundancy restored, then the replacement process continues. If, however, the oscillator still does not have redundancy, a technician can choose to continue the replacement process, but future concurrent DCCA replacements on CEC 300 will not be possible until after the computer system is rebooted.

In embodiments, during the reactivating phase, concurDCCA 110 creates a new TOD clock topology. In embodiments, there is a time of day process that runs on both FSPs in CEC 300. The Time of Day clock topography insures they are sync'd up and in the same state on both FSPs. The recreated TOD clock topology has an active TOD clock on either the FSP of second DCCA 310' or the FSP of the replacement DCCA, and a backup enabled TOD clock on the other of the FSP of second DCCA 310' or the FSP of the replacement DCCA. If concurDCCA 110 cannot create a balanced TOD clock topology, then future concurrent DCCA replacement may not be possible on CEC 300 until after the computer system has been rebooted. However, the system will function even when the TOD clock topology is not balanced.

In embodiments, during the reactivating phase, concurDCCA 110 re-enables the control software for the TPMD on the replacement DCCA. In embodiments, during the reactivating phase, concurDCCA 110 instructs the FSP of the replacement DCCA to assume control of CEC 300.

Figure 4:
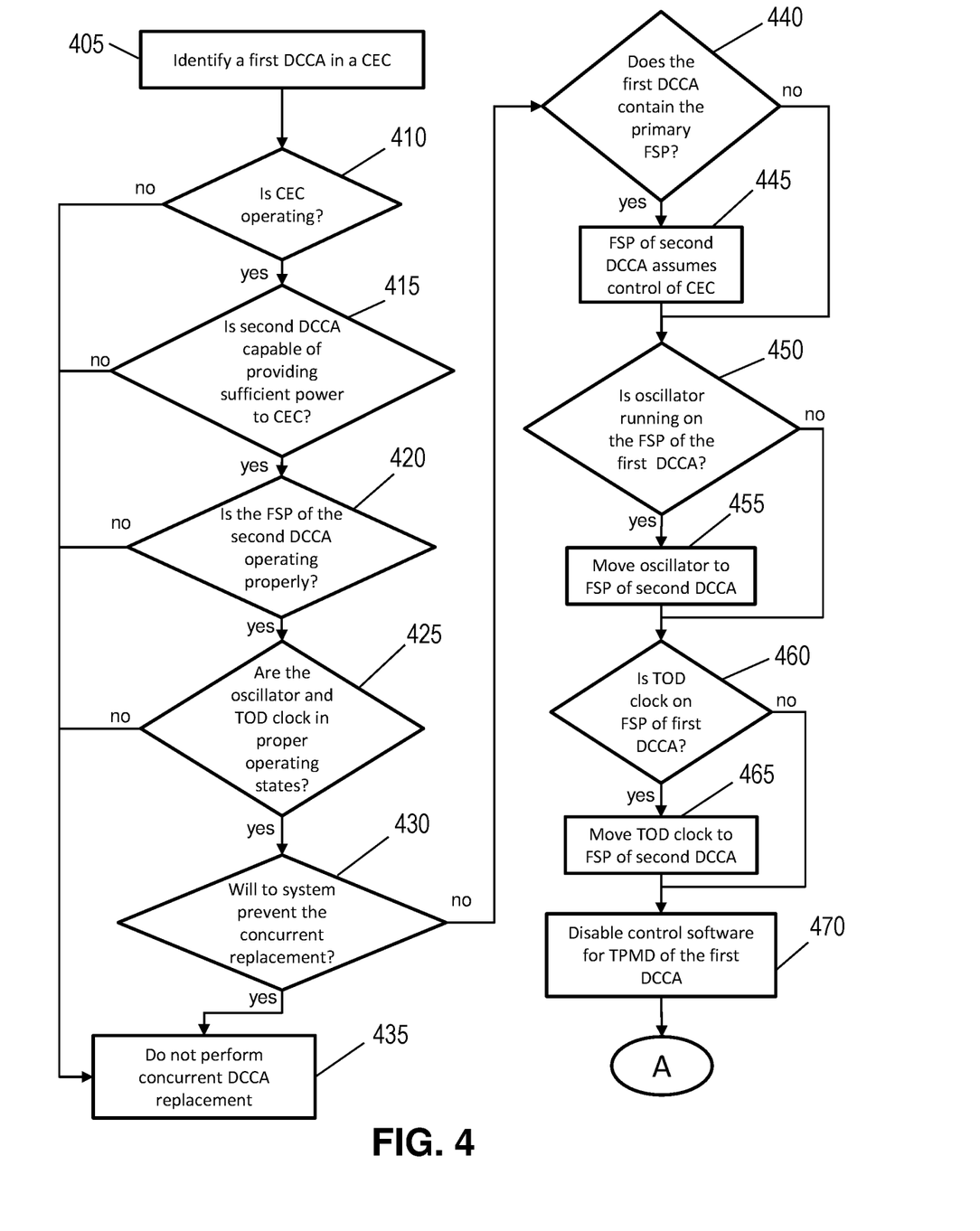
FIG. 4 shows a partial flowchart of an exemplary method in accordance with aspects of the invention.
Figure 5:
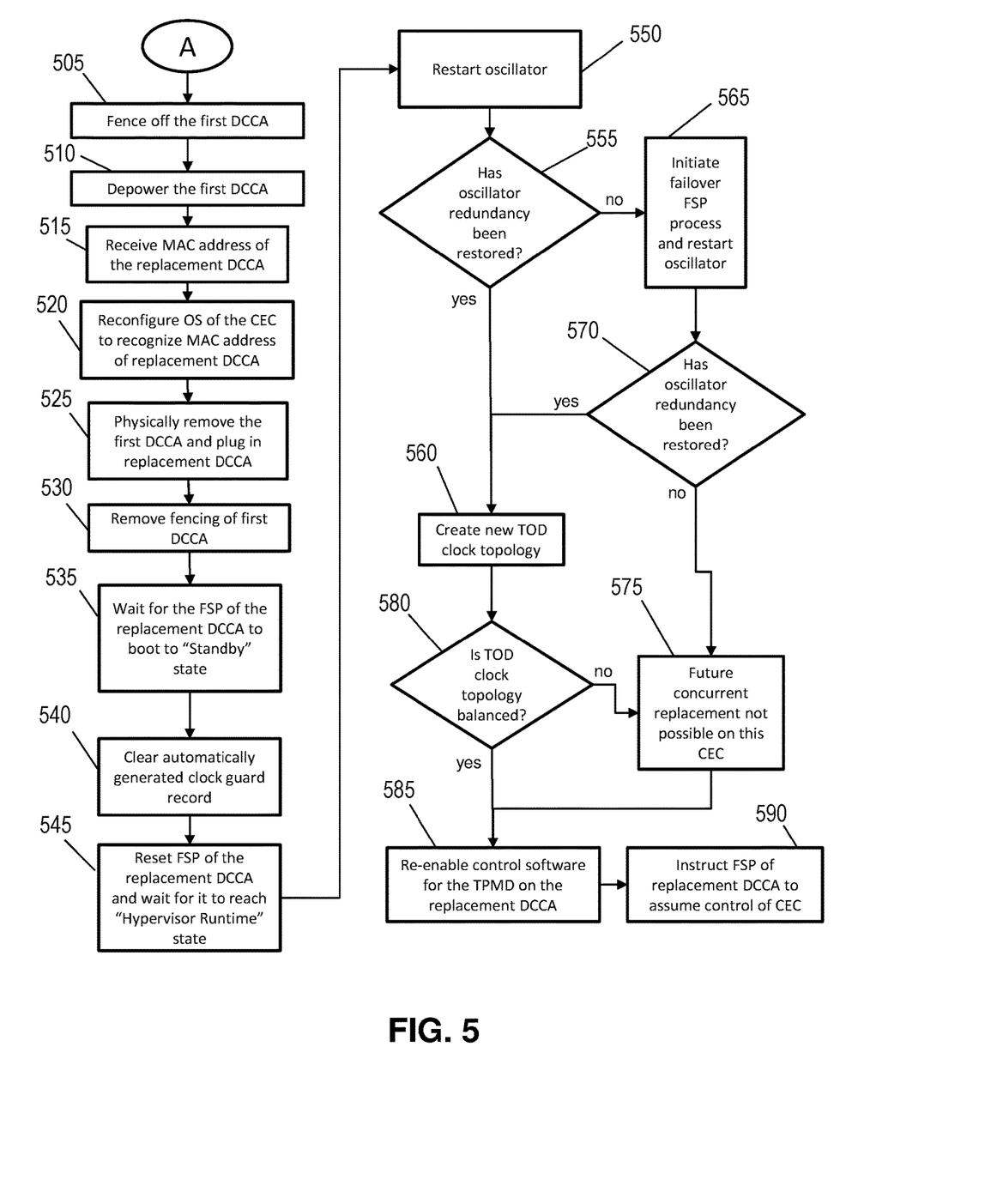
FIG. 5 shows a partial flowchart of an exemplary method in accordance with aspects of the invention.

FIGS. 4 and 5 show a flowchart of an exemplary method in accordance with aspects of the present invention. Steps of the method may be carried out in the environment of FIGS. 2 and 3 and are described with reference to elements depicted in FIGS. 2 and 3.

At step 405, the system identifies a first DCCA in a CEC. In embodiments, and as described with respect to FIG. 2, concurDCCA 110 identifies first DCCA 310 as being a DCCA that is to be replaced.

At step 410, the system determines if the CEC is operating. In embodiments, and as described with respect to FIG. 2, concurDCCA 110 determines if CEC 300 is operating correctly. If concurDCCA 110 determines that CEC 300 is operating correctly, then processing continues to step 415. If concurDCCA 110 determines that CEC 300 is not operating correctly, then processing continues to step 435 where concurDCCA 110 stops the concurrent DCCA replacement.

At step 415, the system determines if the second DCCA is capable of providing sufficient power to the CEC. In embodiments, and as described with respect to FIG. 2, concurDCCA 110 determines if second DCCA 310' is capable of providing sufficient power to CEC 300 to permit first DCCA 310 to be powered down and removed. If concurDCCA 110 determines that the second DCCA is capable of providing sufficient power to the CEC, then processing continues to step 420. If concurDCCA 110 determines that the second DCCA is not capable of providing sufficient power to the CEC, then processing continues to step 435 where concurDCCA 110 stops the concurrent DCCA replacement.

At step 420, the system determines if the FSP of the second DCCA is operating properly. In embodiments, and as described with respect to FIG. 2, concurDCCA 110 determines if the FSP of second DCCA 310' is operating properly. If concurDCCA 110 determines that the FSP of the second DCCA is operating properly, then processing continues to step 425. If concurDCCA 110 determines that the FSP of the second DCCA is not operating properly, then processing continues to step 435 where concurDCCA 110 stops the concurrent DCCA replacement.

At step 425, the system determines if the oscillator and the TOD clock are in proper operating states. In embodiments, and as described with respect to FIG. 2, concurDCCA 110 determines if the oscillator and TOD clock of first DCCA 310 are in proper operating states. If concurDCCA 110 determines that the oscillator and the TOD clock are in proper operating states, then processing continues to step 430. If concurDCCA 110 determines that the oscillator and the TOD clock are not in proper operating states, then processing continues to step 435 where concurDCCA 110 stops the concurrent DCCA replacement.

At step 430, the system determines if the system will prevent the concurrent replacement of the first DCCA. In embodiments, and as described with respect to FIG. 2, concurDCCA 110 determines if the computer device will prevent the concurrent replacement of first DCCA 310 with second DCCA 310'. If concurDCCA 110 determines that the system will not prevent the concurrent replacement of the first DCCA, then processing continues to step 440. If concurDCCA 110 determines that the system will prevent the concurrent replacement of the first DCCA, then processing continues to step 435 where concurDCCA 110 stops the concurrent DCCA replacement.

At step 440, the system determines if the first DCCA contains the primary FSP of the CEC. In embodiments, and as described with respect to FIG. 2, concurDCCA 110 determines if first DCCA 310 contains the primary FSP of CEC 300. If concurDCCA 110 determines that the first DCCA contains the primary FSP of the CEC, then processing continues to step 445. If concurDCCA 110 determines that the first DCCA does not contain the primary FSP of the CEC, then processing continues to step 450.

At step 445, the system instructs the FSP of the second DCCA to assume control of the CEC. In embodiments, and as described with respect to FIG. 2, concurDCCA 110 instructs the FSP of second DCCA 310' to assume control of CEC 300.

At step 450, the system determines if the oscillator is running on the FSP of the first DCCA. In embodiments, and as described with respect to FIG. 2, concurDCCA 110 determines if the oscillator is running on FSP 320 of first DCCA 310. If concurDCCA 110 determines that the oscillator is running on the FSP of the first DCCA, then processing continues to step 455. If concurDCCA 110 determines that the oscillator is not running on the FSP of the first DCCA, then processing continues to step 460.

At step 455, the system moves the oscillator to the FSP of the second DCCA. In embodiments, and as described with respect to FIG. 2, concurDCCA 110 moves the oscillator to the FSP of DCAA 310'.

At step 460, the system determines if the TOD clock is on the FSP of the first DCCA. In embodiments, and as described with respect to FIG. 2, concurDCCA 110 determines if the TOD clock is on FSP 320 of DCAA 310. If concurDCCA 110 determines that the TOD clock is on the FSP of the first DCCA, then processing continues to step 465. If concurDCCA 110 determines that the TOD clock is not on the FSP of the first DCCA, then processing continues to step 470.

At step 465, the system moves the TOD clock to the FSP of the second DCCA. In embodiments, and as described with respect to FIG. 2, concurDCCA 110 move the TOD clock to the FSP of second DCCA 310'.

At step 470, the system disables control software for the TPMD of the first DCCA. In embodiments, and as described with respect to FIG. 2, concurDCCA 110 disables control software for TPMD 330 of DCAA 310.

Referring now to FIG. 5, at step 505 the system fences off the first DCAA. In embodiments, and as described with respect to FIG. 2, concurDCCA 110 fences off DCAA 310.

At step 510 the system depowers the first DCCA. In embodiments, and as described with respect to FIG. 2, concurDCCA 110 depowers first DCCA 310.

At step 515 the system receives the MAC address of the replacement DCCA. In embodiments, and as described with respect to FIG. 2, concurDCCA 110 receives the MAC address of the DCCA that will replace first DCCA 310.

At step 520 the system reconfigures the OS of the CEC to recognize the MAC address of the replacement DCCA. In embodiments, and as described with respect to FIG. 2, concurDCCA 110 reconfigures OS 370 of CEC 300 to recognize the MAC address of the DCCA that will replace first DCCA 310.

At step 525 the first DCCA is physically removed and the replacement DCCA is plugged in. In embodiments, and as described with respect to FIG. 2, a technician physically removes first DCCA 310 from frame 200 and plugs into frame 200 the DCCA that replaces first DCCA 310.

At step 530 the system removes the fencing of the first DCCA. In embodiments, and as described with respect to FIG. 2, concurDCCA 110 removes the fencing of first DCCA 310 from OS 370 put in place at step 505.

At step 535 the system waits for the FSP of the replacement DCCA to boot to a standby state. In embodiments, and as described with respect to FIG. 2, concurDCCA 110 waits for the FSP of the DCCA that replaced first DCCA 310 to boot to its standby state.

At step 540 the system clears an automatically generated clock guard record. In embodiments, and as described with respect to FIG. 2, concurDCCA 110 clears a clock guard record automatically generated on the FSP of second DCCA 310'.

At step 545 the system resets the FSP of the replacement DCCA and waits for it to reach a hypervisor runtime state. In embodiments, and as described with respect to FIG. 2, concurDCCA 110 resets the FSP of the DCCA that replaced first DCCA 310 and waits for the FSP to reach a hypervisor runtime state.

At step 550 the system restarts the oscillator. In embodiments, and as described with respect to FIG. 2, concurDCCA 110 restarts the oscillator that is on the FSP of the DCCA that replaced first DCCA 310.

At step 555 the system determines if oscillator redundancy has been restored. In embodiments, and as described with respect to FIG. 2, concurDCCA 110 determines if oscillator redundancy has been restored to CEC 300. If concurDCCA 110 determines that oscillator redundancy has been restored, then processing continues to step 560. If concurDCCA 110 determines that oscillator redundancy has not been restored, then processing continues to step 565.

At step 560 the system creates a new TOD clock topography. In embodiments, and as described with respect to FIG. 2, concurDCCA 110 creates a new TOD clock topography on both FSPs of CEC 300.

At step 565 the system initiates a failover FSP process and restarts the oscillator. In embodiments, and as described with respect to FIG. 2, concurDCCA 110 initiates a failover FSP process and restarts the oscillator on the FSB of the DCCA that replaced first DCCA 310.

At step 570 the system determines if oscillator redundancy has been restored. In embodiments, and as described with respect to FIG. 2, concurDCCA 110 determines if oscillator redundancy has been restored to CEC 300. If concurDCCA 110 determines that oscillator redundancy has been restored, then processing continues to step 560. If concurDCCA 110 determines that oscillator redundancy has not been restored, then processing continues to step 575.

At step 575 the system concludes that future concurrent replacement of a DCCA of the CEC is not possible. In embodiments, and as described with respect to FIG. 2, concurDCCA 110 concludes that future concurrent replacement of a DCCA of CEC 300 is not possible.

At step 580 the system determines if the TOD clock topography is balanced. In embodiments, and as described with respect to FIG. 2, concurDCCA 110 determines if the TOD clock topography of CEC 300 is balanced. If concurDCCA 110 determines that the TOD clock topography is balanced, then processing continues to step 585. If concurDCCA 110 determines that the TOD clock topography is not balanced, then processing continues to step 575, where the system concludes that future concurrent replacement of a DCCA of the CEC is not possible.

At step 585 the system re-enables control software for the TPMD on the replacement DCCA. In embodiments, and as described with respect to FIG. 2, concurDCCA 110 re-enables control software on CEC 300 for the TPMD on the DCCA that replaced first DCCA 310.

At step 590 the system instructs the FSP of the replacement DCCA to assume control of the CEC. In embodiments, and as described with respect to FIG. 2, concurDCCA 110 instructs the FSP of the DCCA that replaced first DCCA 310 to assume control of CEC 300.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, by a computing device, a first distributed conversion and control assembly (DCCA) in a central electronics complex (CEC) of a computer system, the CEC containing the first DCCA and a second DCCA, each of the first DCCA and the second DCCA having a flexible service processor (FSP);
    determining, by the computing device, that the computer system satisfies preconditions for concurrent replacement of the first DCCA;
    disabling, by the computing device, control software for a thermal and power management device (TPMD) of the first DCCA;
    fencing off, by the computing device, the first DCCA;
    depowering, by the computing device, the first DCCA;
    receiving, by the computing device, a new media access control (MAC) address of a replacement DCCA;
    reconfiguring, by the computing device, an operating system of the CEC to recognize the new MAC address of the replacement DCCA;
    powering on, by the computing device, the replacement DCCA;
    removing, by the computing device, the fencing off of the first DCCA; and
    resetting, by the computing device, an FSP of the replacement DCCA.

2. The method of claim 1, further comprising instructing, by the computing device, the FSP of the second DCCA to assume control of the CEC as a result of the FSP of the first DCCA being a primary FSP of the CEC.

3. The method of claim 2, further comprising moving, by the computing device, an oscillator to the second DCCA as a result of the oscillator running on the FSP of the first DCCA.

4. The method of claim 3, further comprising moving, by the computing device, a time of day (TOD) clock to the second DCCA as a result of the TOD running on the FSP of the first DCCA.

5. The method of claim 4, further comprising starting, by the computing device, an oscillator on the replacement DCCA.

6. The method of claim 5, further comprising enabling, by the computing device, the control software for the TPMD of the first DCCA on a TPMD of the replacement DCCA.

7. The method of claim 6, wherein the resetting of the FSP of the replacement DCCA comprises waiting for the FSP of the replacement DCCA to reach a hypervisor runtime state.

8. The method of claim 7, wherein the determining that the computer system satisfies preconditions comprises:
 determining, by the computing device, that the CEC is operating;
 determining, by the computing device, that the second DCCA is capable of providing sufficient power to power the CEC;
 determining, by the computing device, that the FSP of the second DCCA is operating properly;
 determining, by the computing device, that the oscillator and TOD clock are in a proper operating state and are capable of running on both the first DCCA and the second DCCA; and
 determining, by the computing device, that the computer system will not prevent the replacement of the first DCCA.

9. The method of claim 7, further comprising issuing, by the computing device, a warning that replacement of either the replacement DCCA or the second DCCA is not possible as a result of oscillator redundancy not being restored in the CEC.

10. The method of claim 1, wherein the determining that the computer system satisfies preconditions comprises:
 determining, by the computing device, that the CEC is operating;
 determining, by the computing device, that the second DCCA is capable of providing sufficient power to power the CEC;
 determining, by the computing device, that the FSP of the second DCCA is operating properly;
 determining, by the computing device, that an oscillator and a time of day (TOD) clock are in a proper operating state and are capable of running on both the first DCCA and the second DCCA; and
 determining, by the computing device, that the computer system will not prevent the replacement of the first DCCA.

11. A computer program product comprising one or more computer readable storage media having program instructions collectively stored on the one or more computer readable storage media, the program instructions executable to:
 identify a first distributed conversion and control assembly (DCCA) in a central electronics complex (CEC) of a computer system, the CEC containing the first DCCA and a second DCCA, each of the first DCCA and the second DCCA having a flexible service processor (FSP);
 determine that the computer system satisfies preconditions for concurrent replacement of the first DCCA;
 move an oscillator to the second DCCA as a result of the oscillator running on the FSP of the first DCCA;
 depower the first DCCA;
 receive a new media access control (MAC) address of a replacement DCCA;
 reconfigure an operating system of the CEC to recognize the new MAC address of the replacement DCCA;
 power on the replacement DCCA; and
 reset an FSP of the replacement DCCA.

12. The computer program product of claim 11, wherein the program instructions are further executable to disable control software for a thermal and power management device (TPMD) of the first DCCA.

13. The computer program product of claim 11, wherein the program instructions are further executable to:
 fence off the first DCCA; and
 remove the fencing off of the first DCCA.

14. The computer program product of claim 13, wherein the determining that the computer system satisfies preconditions comprises:
 determining that the CEC is operating;
 determining that the second DCCA is capable of providing sufficient power to power the CEC; and
 determining that the FSP of the second DCCA is operating properly.

15. The computer program product of claim 14, wherein the determining that the computer system satisfies preconditions further comprises:
 determining that an oscillator and a time of day (TOD) clock are in a proper operating state and are capable of running on both the first DCCA and the second DCCA; and
 determining that the computer system will not prevent the replacement of the first DCCA.

16. The computer program product of claim 11, the resetting of the FSP of the replacement DCCA comprises waiting for the FSP of the replacement DCCA to reach a hypervisor runtime state.

17. A system comprising:
 a processor, a computer readable memory, one or more computer readable storage media, and program instructions collectively stored on the one or more computer readable storage media, the program instructions executable to:
 identify a first distributed conversion and control assembly (DCCA) in a central electronics complex (CEC) of a computer system, the CEC containing the first DCCA and a second DCCA, each of the first DCCA and the second DCCA having a flexible service processor (FSP);
 determine that the CEC is operating;
 determine that the second DCCA is capable of providing sufficient power to power the CEC;
 determine that an oscillator and a time of day (TOD) clock are in a proper operating state and are capable of running on both the first DCCA and the second DCCA;
 determine that the computer system will not prevent the replacement of the first DCCA;
 disable control software for a thermal and power management device (TPMD) of the first DCCA;
 fence off the first DCCA;
 depower the first DCCA;

receive a new media access control (MAC) address of a replacement DCCA; and reconfigure an operating system of the CEC to recognize the new MAC address of the replacement DCCA.

18. The system of claim 17, wherein the program instructions are further executable to determine that the FSP of the second DCCA is operating properly.

19. The system of claim 17, wherein the program instructions are further executable to:

power on the replacement DCCA;

remove the fencing off of the first DCCA; and reset an FSP of the replacement DCCA.

20. The system of claim 19, wherein the program instructions are further executable to instruct the FSP of the second DCCA to assume control of the CEC as a result of the FSP of the first DCCA being a primary FSP of the CEC.

* * * * *